Nov. 14, 1950 W. A. HARRIS 2,529,550

TWO-WAY RADIO COMMUNICATION SYSTEM

Filed July 27, 1944

INVENTOR.
WALTER A. HARRIS.

BY H G Grover

ATTORNEY

Patented Nov. 14, 1950 2,529,550

UNITED STATES PATENT OFFICE 2,529,550

TWO-WAY RADIO COMMUNICATION SYSTEM

Walter A. Harris, Haddonfield, N. J., assignor to Radio Corporation of America, a corporation of Delaware Application July 27, 1944, Serial No. 546,845

5 Claims. (Cl. 250—6)

Figures 1, 2:
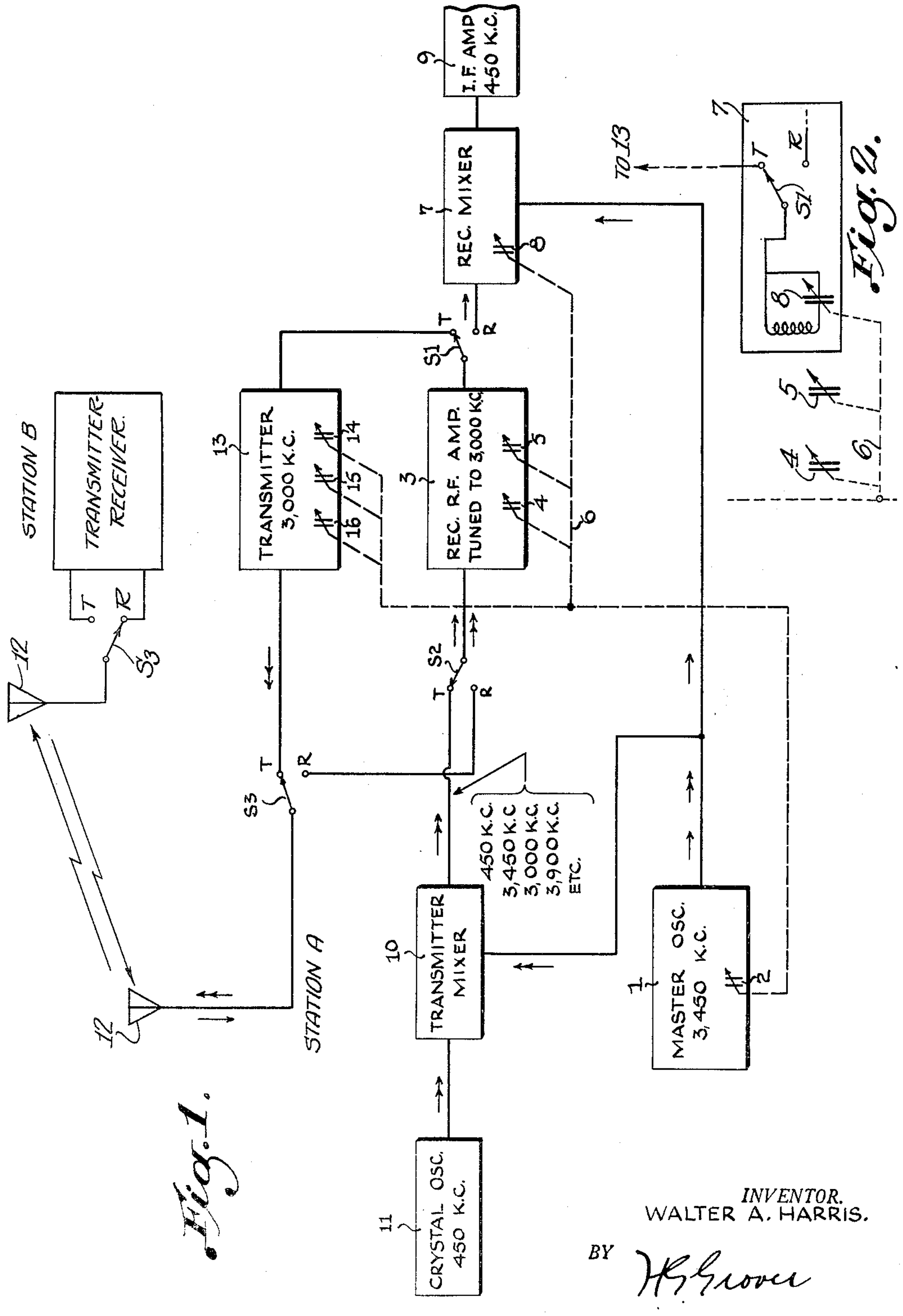

The present invention relates in general to a radio communication system, and more particularly to an improved system for two-way communication between a plurality of transceivers in which the selector circuits of the receiver are utilized in transmission to assure transmission on the same carrier frequency as that utilized for reception.

The invention is particularly applicable to mobile military communication systems where it is vital to have a number of mobile communication transmitters all working at exactly the same frequency. Systems using crystals ground to the same operating frequency are not flexible enough, particularly for aircraft use where a group of transmitters provided each with a multiplicity of crystals may get scattered all over the world in a matter of days.

It is therefore one of the objects of the present invention to provide a two-way communication system which is assured of operating at the same frequency for both transmission and reception.

A further object of the invention is the use, in a combined receiver-transmitter, of the receiver tunable selector circuits as a filter network during transmission so that the transmitter carrier frequency is the same as the frequency to which the receiver is tuned.

A more specific object of the invention is to assure communication between a plurality of radio stations on the same carrier frequency by providing the transmitter-receiver at each station with a first oscillator common to both receiver and a transmitter, means during reception for supplying the frequency of said oscillator to the first detector of the receiver, a second oscillator, means during transmission for mixing the frequencies from said first and second oscillators, and means for coupling the output of said mixing means to the transmitter through the tunable radio frequency circuits of the receiver to thereby assure transmission of a carrier frequency identical to that utilized for reception.

Other objects and advantages will become apparent from the following description when read in conjunction with the accompanying drawings in which Fig. 1 discloses, in block diagram form, a two-way communication system and so much of the receiver-transmitter at one of the stations as is necessary for a proper understanding of the present invention; and Fig. 2 is a modification of a portion of the system disclosed in Fig. 1.

Briefly, the method employed utilizes a selected one of a plurality of available frequencies as the carrier for transmission in one direction and the same carrier for transmission in the other direction. Tuning the receiver at any one station to the carrier frequency transmitted from a second station will simultaneously tune the transmitter at the first station to the same carrier being transmitted from the second station.

By way of example, there is schematically shown in Fig. 1 of the drawing a pair of communicating stations A and B, of which any desired number of similar or other construction may be utilized for carrying out the above method. It is essential to the successful operation of this system that a net of several stations maintain an agreed-upon common working frequency for a given period during which communication is desired. Although any desired frequency range may be employed, certain frequencies have been assumed and are indicated in the drawing.

Referring more particularly to that portion of Fig. 1 which constitutes station A, the local oscillator voltage for the receiver and the basic oscillator voltage for the transmitter are derived from a common, master oscillator 1, the frequency determining circuit of which is tuned by a variable condenser 2.

The receiver is of the superheterodyne type and comprises a radio frequency (R. F.) amplifier 3 which is provided with a tunable input or antenna circuit and a tunable output circuit, the tuning condensers of which are shown at 4 and 5 arranged for uni-control adjustment by suitable means represented by the dash line 6. The output of R. F. amplifier 3 is connected to a first detector or mixer stage 7 through a switch S1 in the R or receive position. The input of the mixer stage is also provided with a tunable circuit of which condenser 8 is the adjustable element arranged to be uni-controlled with condensers 4 and 5. The output of the mixer stage is fed to an intermediate frequency (I. F.) amplifier stage 9, the output of which is fed, as is normally the case in superheterodyne receivers, through successively a second detector, an audio frequency amplifier and a reproducing device, not shown. The oscillator or heterodyne frequency for the receiver is derived from the master oscillator 1 which is adjusted by condenser 2 to a frequency such that when mixed with the received frequency selected by the tuned circuits of amplifier 3, the resultant frequency will be that to which I. F. amplifier is tuned.

In transmission, the output of master oscillator 1 is fed to a transmitter mixer 10 which also receives the output of a crystal-controlled oscillator 11 operating at the frequency of the receiver I. F. amplifier 9. The output of the transmitter mixer is coupled through a switch S2 in the T or transmit position to the input of the receiver R. F. amplifier 3, the output of the latter in turn being coupled through the switch S1 in the T or transmit position to the tunable stages of a transmitter 13. The latter may comprise tunable input and output circuits of an intermediate power amplifier and a tunable output circuit of a final or power amplifier, the variable condensers 14, 15 and 16 representing, respectively, the tuning elements of said circuits which are adapted to be uni-controlled with the condensers 4 and 5 of the receiver amplifier 3. The output of transmitter 13 is coupled through a switch S3 in the T or transmit position to an antenna 12. For clarity the signal path during reception is indicated by the single arrows while the signal path for transmission is indicated by the double arrows. The several switches S1, S2 and S3 are adapted for simultaneous operation between their T and R positions by means of a transmit-receive relay, not shown, commonly used in transceiver installations. Since in the operation of the system the carrier frequency for reception must be the same as that for transmission, it is necessary that the tunable circuits of R. F. amplifier 3 and those of transmitter 13 be adjusted to the same frequency. Advantage is taken of this fact so that in transmission the tunable circuits of the receiver R. F. amplifier 3, which are already tuned to the operating frequency, are employed as a tuned filter for selecting from the transmitter mixer output the desired carrier frequency for transmission.

As a typical example, certain frequencies are given in the figure for the various component units, assuming that 3000 kc. is the desired frequency operation. With the crystal-controlled oscillator 11 operating at 450 kc. and the master oscillator 1 operating at 3450 kc., there will appear in the output of mixer 10 the following frequencies: 450 kc., 3450 kc., 3000 kc., 3900 kc., and others. R. F. amplifier stage 3 of the receiver being tuned to the operating frequency of 3000 kc., it will select from the mixer output the 3000 kc. component which is then amplified in the transmitter stage 13 and radiated from antenna 12. The use of the receiver amplifier as a tuned filter makes it impossible to select the wrong beat frequency for transmission.

In reception the frequency 3450 kc. of the master oscillator 1 and the 3000 kc. frequency of amplifier 3 are mixed in the mixer stage 7 to produce the intermediate frequency of 450 kc., the frequency to which I. F. amplifier stage 9 is tuned.

Although in Fig. 1 I have shown the use of only the tuned stages of the R. F. amplifier as a filter in transmission, if necessary the tuned input circuit of the mixer stage 7 may also be utilized for such purpose, as shown in the partial view of Fig. 2.

For illustrative purposes I have shown at 1 a variable master oscillator and at 11 a crystal-controlled oscillator of the same frequency as the receiver I. F. amplifier. My invention is also applicable to the system disclosed and claimed in the application of H. A. Robinson, Ser. No. 542,746, filed June 29, 1944, now U. S. Patent 2,419,953 granted April 29, 1947, and assigned to the same assignee as this application, wherein the common oscillator for the transmitter and receiver is a crystal-controlled fixed frequency oscillator and the I. F. oscillator is variable together with the I. F. amplifier of the receiver over a limited range of frequencies.

While I have shown and described a preferred embodiment of my invention, it will be understood that various modifications and changes will occur to those skilled in the art without departing from the spirit and scope of this invention, I therefore contemplate by the appended claims to cover any such modifications as fall within the true spirit and scope of my invention.

What I claim is:

1. In a two-way communication system, a plurality of radio stations adapted to communicate with one another on the same carrier frequency, each station comprising a transmitter and a superheterodyne receiver provided with tunable radio frequency circuits, a first oscillator common to both receiver and transmitter, means during reception for supplying the frequency of said oscillator to the first detector of the receiver, a second oscillator, means during transmission for mixing the frequencies from said first and second oscillators, and means for coupling the output of said mixing means to the transmitter through the tunable radio frequency circuits of the receiver to thereby assure transmission of a carrier frequency identical to that utilized for reception.

2. In a two-way communication system, a plurality of radio stations adapted to communicate with one another on the same carrier frequency, each station comprising a transmitter and a superheterodyne receiver, a variably tuned oscillator common to both receiver and transmitter, means during reception for supplying a predetermined frequency of said oscillator to the first detector of the receiver, an intermediate frequency amplifier fixed tuned to the output of the first detector, a crystal-controlled fixed frequency oscillator operating at the same frequency as the intermediate frequency amplifier, means during transmission for mixing the frequencies from said fixed and variable oscillators, and means for coupling the output of said mixing means to the transmitter through the tunable radio frequency circuits of the receiver to thereby assure transmission of a carrier frequency identical to that utilized for reception.

3. In a two-way communication system, a plurality of stations adapted to communicate with one another and adapted for selective operation on one of a plurality of frequency channels which is the same for both transmission and reception, each station comprising a transmitter, a superheterodyne receiver provided with an intermediate frequency amplifier tuned to a predetermined frequency, a first oscillator tuned to said same predetermined frequency, a second oscillator adapted during reception to serve as the local oscillator for the receiver and adapted during transmission to be mixed with the predetermined frequency of said first oscillator to provide a desired carrier frequency for the transmitter, means for mixing the frequencies of the first and second oscillators, and means for selecting the desired carrier frequency from said mixed frequencies, said latter means constituting the tunable radio frequency circuits of the receiver.

4. In a two-way communication system, a plurality of stations adapted to communicate with one another and adapted on a selected one of a plurality of frequency channels which is the same for both transmission and reception, each station comprising a transmitter provided with tunable radio frequency circuits, a superheterodyne receiver provided with tunable radio frequency circuits and with an intermediate frequency amplifier tuned to a predetermined frequency, a first oscillator tuned to said same predetermined frequency, a second oscillator variable in frequency adapted during reception to serve as the local oscillator for the receiver and adapted during transmission to be mixed with the predetermined frequency of said first oscillator to provide a desired carrier frequency for the transmitter, means for mixing the frequencies of the first and second oscillators, and means including the tunable radio frequency circuits of the receiver for selecting the desired carrier frequency from said mixed frequencies.

5. In a two-way communication system, a plurality of radio stations adapted to communicate with one another on the same frequency, each station comprising a transmitter, a receiver provided with tunable radio frequency amplifier circuits, a first oscillator, and a transmit-receive switching means for effectively coupling said oscillator through the tunable radio frequency amplifier circuits of the receiver to the transmitter to thereby provide a filter network to assure transmission of a carrier frequency substantially identical to that utilized for reception, and another oscillator coupled to said switching means and cooperating with said first oscillator in the transmitting position only of said switching means.

WALTER A. HARRIS.

REFERENCES CITED

The following references are of record in the file of this patent:

UNITED STATES PATENTS

| Number | Name | Date |
|---|---|---|
| 1,524,413 | Sterns | Jan. 27, 1925 |
| 2,018,569 | Pettengill et al. | Oct. 22, 1935 |
| 2,106,159 | Runge | Jan. 25, 1938 |
| 2,366,329 | George | Jan. 2, 1945 |
| 2,408,826 | Vogel | Oct. 8, 1946 |
| 2,419,593 | Robinson | Apr. 29, 1947 |
| 2,447,490 | Collins | Aug. 24, 1948 |

FOREIGN PATENTS

| Number | Country | Date |
|---|---|---|
| 551,472 | Great Britain | Feb. 24, 1942 |